United States Patent
Kim

(10) Patent No.: US 11,451,875 B2
(45) Date of Patent: Sep. 20, 2022

(54) MACHINE LEARNING-BASED APPROACH TO DEMOGRAPHIC ATTRIBUTE INFERENCE USING TIME-SENSITIVE FEATURES

(71) Applicant: Samsung Electronics Co., Ltd., Suwon-si (KR)

(72) Inventor: Hyun-Woo Kim, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/359,684

(22) Filed: Mar. 20, 2019

(65) Prior Publication Data

US 2019/0373332 A1 Dec. 5, 2019

Related U.S. Application Data

(60) Provisional application No. 62/680,369, filed on Jun. 4, 2018.

(51) Int. Cl.
*H04N 21/482* (2011.01)
*G06N 20/00* (2019.01)
*H04N 21/475* (2011.01)

(52) U.S. Cl.
CPC ......... *H04N 21/4826* (2013.01); *G06N 20/00* (2019.01); *H04N 21/4751* (2013.01)

(58) Field of Classification Search
CPC .......... G06N 20/00; G06N 3/08; G06N 7/005; G06N 3/0445; G06N 5/022; H04L 67/22;

(Continued)

(56) References Cited

U.S. PATENT DOCUMENTS 8,924,993 B1 * 12/2014 Niebles Duque ........................... H04N 21/25883
725/9
10,051,327 B1 * 8/2018 Nieuwenhuys .. H04N 21/44222
(Continued)

FOREIGN PATENT DOCUMENTS

| KR | 10-2016-0087263 A | 7/2016 |
| WO | 2017/095942 A1 | 6/2017 |
| WO | 2018/038384 A1 | 3/2018 |

OTHER PUBLICATIONS

International Search Report dated Apr. 10, 2020 in connection with International Patent Application No. PCT/KR2020/000156, 3 pages.

(Continued)

*Primary Examiner* — Jason Salce

(57) ABSTRACT

A system and method for predicting user demographics based on a user's television, or media, viewing habits using machine learning algorithms is provided. A method of predicting a user's demographics comprises acquiring training data including one or more household data, person identification data, program title data, or watch time data. The method includes assessing a set of features. In addition, the method includes training one or more models based on the training data and set of features. The method includes acquiring viewing history data associated with at least one user. The method further includes determining one or more attributes associated with the at least one user based on inputting the viewing history data into the one or more models.

20 Claims, 10 Drawing Sheets

(58) Field of Classification Search
CPC .......... H04N 21/4532; H04N 21/4668; H04N 21/25891; H04N 21/4667; H04N 21/44222; H04N 21/251; H04N 21/252; H04N 21/4826
See application file for complete search history.

(56) References Cited

U.S. PATENT DOCUMENTS

| | | | | |
|---|---|---|---|---|
| 2003/0101449 A1* | 5/2003 | Bentolila | ........... | G06Q 30/0251 725/10 |
| 2003/0182249 A1* | 9/2003 | Buczak | ............. | H04N 7/16 706/15 |
| 2005/0193414 A1* | 9/2005 | Horvitz | ............. | H04N 21/4335 725/46 |
| 2009/0024546 A1* | 1/2009 | Ficcaglia | ............. | G06Q 30/02 706/46 |
| 2010/0191689 A1* | 7/2010 | Cortes | ............. | G06F 16/783 706/46 |
| 2011/0110621 A1* | 5/2011 | Duncan | ............. | E21B 47/06 385/13 |
| 2011/0153663 A1* | 6/2011 | Koren | ............. | H04N 21/4668 707/776 |
| 2012/0030586 A1* | 2/2012 | Ketkar | ............. | G06Q 30/0269 715/751 |
| 2014/0130076 A1* | 5/2014 | Moore | ............. | H04N 21/25883 725/19 |
| 2014/0363137 A1* | 12/2014 | Kuhne | ............. | G11B 27/034 386/239 |
| 2014/0380350 A1* | 12/2014 | Shankar | ............. | G06Q 30/0204 725/18 |
| 2015/0020086 A1* | 1/2015 | Chen | ............. | H04N 21/44218 725/12 |
| 2015/0081604 A1 | 3/2015 | Duque et al. | | |
| 2015/0178265 A1* | 6/2015 | Anderson | ............. | G06F 16/951 704/9 |
| 2015/0271540 A1* | 9/2015 | Melby | ............. | H04N 21/252 725/34 |
| 2016/0037201 A1* | 2/2016 | Kitts | ............. | H04N 21/25883 725/35 |
| 2016/0066041 A1 | 3/2016 | Fei et al. | | |
| 2016/0165277 A1* | 6/2016 | Kirillov | ............. | H04N 21/251 725/14 |
| 2016/0212484 A1 | 7/2016 | Kimble et al. | | |
| 2016/0269766 A1* | 9/2016 | Levande | ............. | H04N 21/25883 |
| 2017/0006342 A1* | 1/2017 | Nagaraja Rao | .... | H04N 21/4661 |
| 2017/0060880 A1 | 3/2017 | Sabin | | |
| 2017/0142482 A1* | 5/2017 | Zhou | ............. | H04N 21/44222 |
| 2017/0171632 A1 | 6/2017 | Perez | | |
| 2017/0286999 A1 | 10/2017 | Nemirofsky | | |
| 2017/0324996 A1* | 11/2017 | Thaker | ............. | H04N 21/4668 |
| 2017/0359580 A1* | 12/2017 | Su | ............. | H04N 19/103 |
| 2017/0364822 A1 | 12/2017 | Davis et al. | | |
| 2018/0025010 A1* | 1/2018 | Ramer | ............. | H04L 67/22 707/727 |
| 2018/0152763 A1* | 5/2018 | Barlaskar | ............. | G06Q 30/0255 |
| 2018/0189660 A1* | 7/2018 | Malmi | ............. | G06N 5/04 |
| 2018/0260857 A1* | 9/2018 | Kar | ............. | G06Q 30/0254 |
| 2019/0149863 A1* | 5/2019 | Lewis | ............. | G06N 20/00 |
| 2019/0200076 A1 | 6/2019 | Sanchesshayda et al. | | |
| 2019/0208272 A1* | 7/2019 | Hattery | ............. | H04N 21/858 |
| 2019/0268632 A1* | 8/2019 | Foerster | ............. | H04N 21/6587 |
| 2019/0268666 A1* | 8/2019 | Lee | ............. | H04W 4/023 |
| 2021/0174381 A1* | 6/2021 | Cui | ............. | H04N 21/251 |

OTHER PUBLICATIONS

Written Opinion of the International Searching Authority dated Apr. 10, 2020 in connection with International Patent Application No. PCT/KR2020/000156, 6 pages.

* cited by examiner

Sessionization of Viewing History

Combine all repetitive log datapoints as one time block if the state remained the same 510 — 
- 8:00pm John Doe watched "XYZ-TV-SHOW Season 1 Episode 1" on Channel 1
- 8:01pm John Doe watched "XYZ-TV-SHOW Season 1 Episode 1" on Channel 1
- 8:02pm John Doe watched "XYZ-TV-SHOW Season 1 Episode 1" on Channel 1
- ...
- 8:30pm John Doe watched "XYZ-TV-SHOW Season 1 Episode 1" on Channel 1

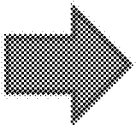

Sessionization

520 — 8:00pm – 8:30pm John Doe watched "XYZ-TV-SHOW Season 1 Episode 1" on Channel 1

This is one session (on viewership)

FIGURE 5

Household Demographics Prediction

Combination of General Machine Learning and Deep Learning Algorithms

- 7,000+ features
  - Time-sensitive features
  - Keyword features
  - Title features
  - Duration features

FIGURE 7

MACHINE LEARNING-BASED APPROACH TO DEMOGRAPHIC ATTRIBUTE INFERENCE USING TIME-SENSITIVE FEATURES

CROSS-REFERENCE TO RELATED APPLICATION AND PRIORITY CLAIM

This application claims priority under 35 U.S.C. § 119(e) to U.S. Provisional Patent Application No. 62/680,369 filed on Jun. 4, 2018. This provisional application is hereby incorporated by reference in its entirety.

TECHNICAL FIELD

This disclosure relates generally to a computing system and method, and more particularly to a machine learning based approach for predicting user demographics.

BACKGROUND

Users watch or otherwise in engage with content, such as media or multimedia content, viewed on a television or other electronic devices capable of displaying viewer content. It can be beneficial to obtain additional information about the users as they view the content. For example, additional information obtained for a particular user can be utilized by an entity to provide more content and/or content with a higher likelihood of being relevant or interesting to a particular user. In this way various businesses and entities can deliver targeted advertisements (ads) based on gender, age group and other user demographics.

Methods used to predict user attributes are able to do so because household information such as how many members are in a household, genders of household members, and ages of household members accompany the viewing data. Other methods can predict attributes or demographics of a user if there is only one user of the device. There is a lack of reliable approaches for predicting or determining user attributes as inferred from viewing habits on a communal television or media device.

SUMMARY

This disclosure provides a system and method for predicting user demographics based on a user's television, or media, viewing habits using machine learning algorithms.

In a first embodiment, a method of operation of a computing system comprises acquiring training data including one or more household data, person identification data, program title data, or watch time data. The method includes assessing a set of features including a first set of features associated with one or more specific time slices. The method also includes training one or more models based on the training data and set of features. The method includes acquiring viewing history data associated with at least one user. The method further includes determining one or more attributes associated with the at least one user based on inputting the viewing history data into the one or more models.

In a second embodiment, a computing system includes at least one processor. The at least one processor is configured to acquire training data including one or more household data, person identification data, program title data, or watch time data; assess a set of features including a first set of features associated with one or more specific time slices; train one or more models based on the training data and set of features; acquire viewing history data associated with at least one user; and determine one or more attributes associated with the at least one user based on inputting the viewing history data into the one or more models.

In a third embodiment, a non-transitory computer readable medium configured to store a plurality of instructions is provided. The plurality of instructions, when executed by at least one processor, are configured to cause the at least one processor to acquire training data including one or more household data, person identification data, program title data, or watch time data; assess a set of features including a first set of features associated with one or more specific time slices; train one or more models based on utilizing machine learning with the training data and set of features; acquire viewing history data associated with at least one user; and determine one or more attributes associated with the at least one user based on inputting the viewing history data into the one or more models.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B.

As used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such SAMSUNG HOMESYNC, APPLETV, or GOOGLE TV), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description, taken in conjunction with the accompanying drawings, in which:

FIG. 5 illustrates an example of sessionization of viewing history according to an embodiment of this disclosure;

FIG. 7 illustrates example feature vectors used by one or more machine learning approaches for predicting household demographics according to an embodiment of this disclosure;

DETAILED DESCRIPTION

Figure 1:
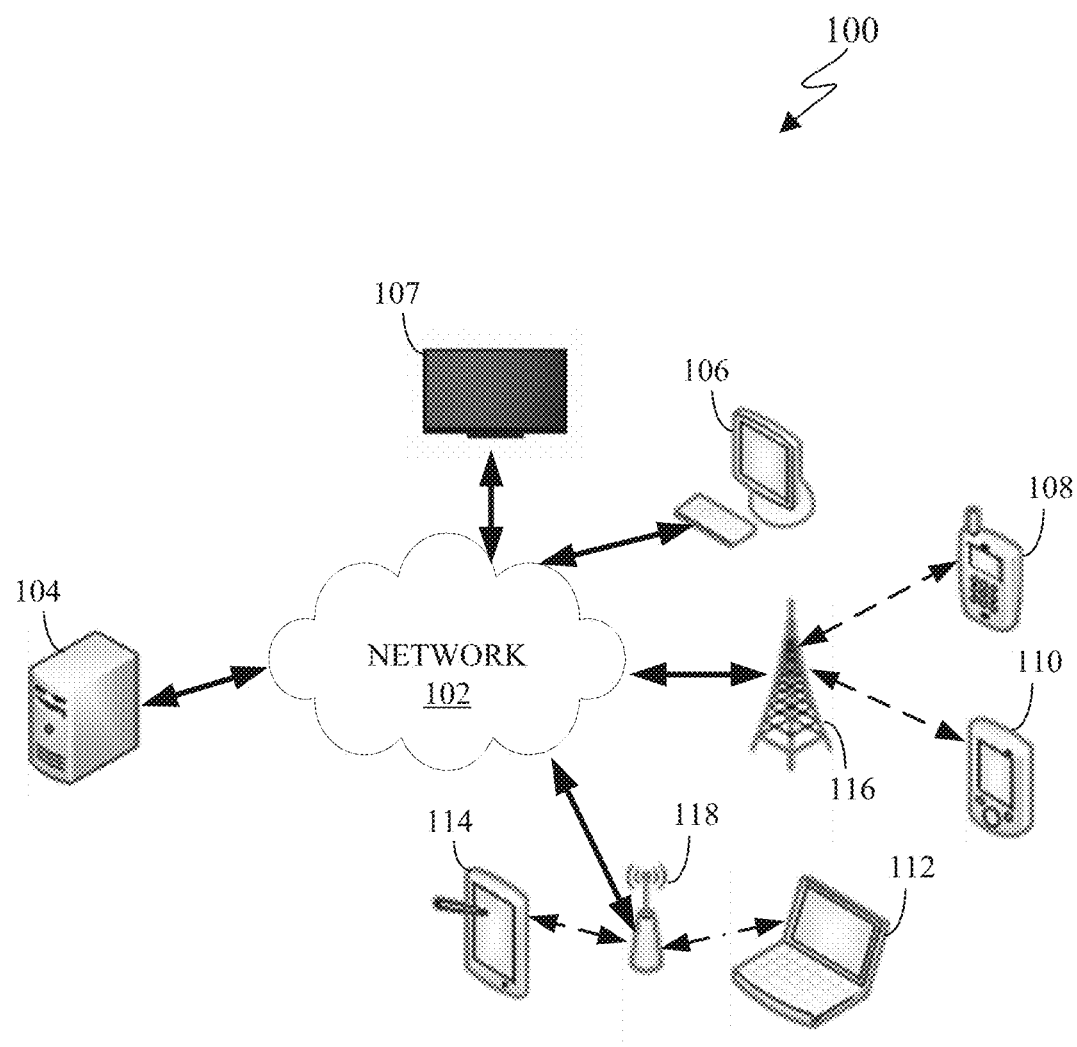
FIG. 1 illustrates an example communication system according to an embodiment of this disclosure.

FIGS. 1 through 10 discussed below, and the various embodiments used to describe the principles of this disclosure in this patent document are by way of illustration only and should not be construed in any way to limit the scope of the disclosure. Those skilled in the art will understand that the principles of this disclosure can be implemented in any suitably arranged system.

This disclosure generally provides a machine learning algorithm that can infer, predict, estimate and/or otherwise determine demographic attributes of a user. Initially a machine learning algorithm creates a predictive model based on training data, such as third party data. For example, the third-party data includes NIELSEN ratings which disclose household data and personal identification data. The predictive model uses thousands of time-sensitive or other variables to predict household demographics. Viewing history data associated with a user, for example Automatic Content Recognition (ACR) data or Electronic Program Guide (EPG) data, is input into the predictive model such that demographic attributes associated with the user can be determined. The viewing history data is gathered from a smart TV device. The predictive model can predict demographic attributes of individuals, instead of mixtures of different people within a household, with high accuracy according to embodiments of this disclosure. Additionally, the predictive model can determine how many people live in a given household and how old each person is, rather than only determining the probability of the given household having at least one person in an age group of age X to age Y according to embodiments of this disclosure. Since the predictive model can accurately predict a user's attributes, such as age and gender, targeted advertisement and programming content can be directed to a particular user while that user is watching television.

According to embodiments of this disclosure, the use of thousands of time sensitive features, or other variables, increases the predictive accuracy significantly. For example, various time slices used include: 48 time units a day (30 minutes each); 24 time units a day (1 hour each); days of the week (7 time units, Monday through Sunday); a weekday; a weekend; and parts of a day, including prime access, prime time, late news, late fringe, post late fringe, morning, daytime and early fringe.

An electronic device, according to embodiments of this disclosure, can include personal computers (such as a laptop or a desktop), a workstation, a server, a television, an appliance, and the like. Additionally, the electronic device can be at least one part of a piece of furniture or building/structure, an electronic board, an electronic signature receiving device, a projector, or a measurement device. In some embodiments, the electronic device can be a portable electronic device like a portable communication device (such as a smartphone or mobile phone), a laptop, a tablet, an electronic book reader (such as an e-reader), a personal digital assistant (PDA), a portable multimedia player (PMP), an MP3 player, a mobile medical device, a virtual reality headset, a portable game console, a camera, or a wearable device, among others. Additionally, the electronic device as disclosed herein is not limited to the above-listed devices and can include new electronic devices depending on the development of technology. It is noted that, as used here, the term "user" may denote a human or another device (such as an artificial intelligent electronic device) using the electronic device.

FIG. 1 illustrates an example communication system 100 in accordance with embodiments of this disclosure. The embodiment of the system 100 shown in FIG. 1 is for illustration only. Other embodiments of the system 100 can be used without departing from the scope of this disclosure.

The system 100 includes a network 102 that facilitates communication between various components in the system 100. For example, the network 102 can communicate Internet Protocol (IP) packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-114. The client devices 106-114 may be, for example, a TV, a smartphone, a tablet computer, a laptop, a personal computer, a wearable device, a head-mounted display (HMD), or the like. The server 104 can represent one or more servers. Each server 104 includes any suitable computing or processing device that can provide computing services for one or more client devices, such as the client devices 106-114. Each server 104 could, for example, include one or more processing devices, one or more memories storing instructions and data, and one or more network interfaces facilitating communication over the network 102.

Each client device 106-114 represents any suitable computing or processing device that interacts with at least one server (such as the server 104) or other computing device(s) over the network 102. In this example, the client devices 106-114 include a desktop computer 106, a TV 107, a mobile telephone or mobile device 108 (such as a smartphone), a PDA 110, a laptop computer 112, and a tablet computer 114. However, any other or additional client devices could be used in the system 100. Smartphones represent a class of mobile devices 108 that are handheld devices with mobile operating systems and integrated mobile broadband cellular network connections for voice, short message service (SMS), and Internet data communications. As described in more detail below, an electronic device (such as the desktop computer 106, TV 107, mobile device 108, PDA 110, laptop computer 112, or tablet computer 114) can include a user interface engine that modifies one or more user interface buttons displayed to a user on a touchscreen.

In this example, some client devices 108-114 communicate indirectly with the network 102. For example, the client devices 108 and 110 (mobile device 108 and PDA 110, respectively) communicate via one or more base stations 116, such as cellular base stations or eNodeBs (eNBs). Also, the client devices 112 and 114 (laptop computer 112 and tablet computer 114, respectively) communicate via one or more wireless access points 118, such as IEEE 802.11 wireless access points. Note that these are for illustration only and that each client device 106-114 could communicate directly with the network 102 or indirectly with the network 102 via any suitable intermediate device(s) or network(s).

In some embodiments, any of the client devices 106-114 transmits information securely and efficiently to another device, such as, for example, the server 104. Also, any of the client devices 106-114 can trigger the information transmission between itself and server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
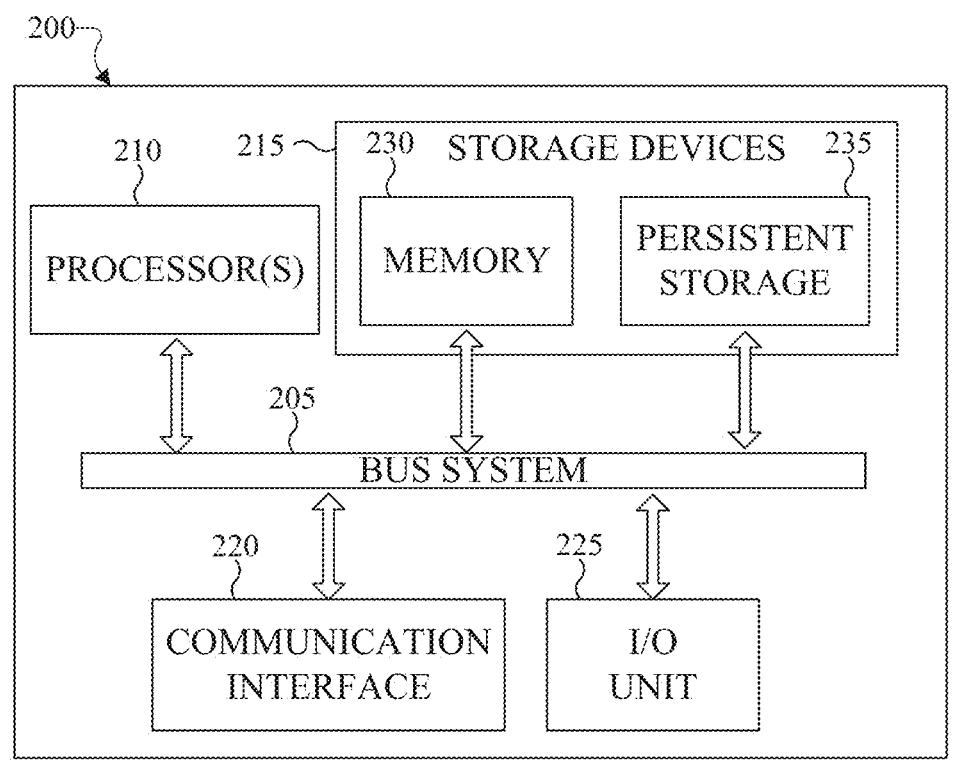
FIG. 2 illustrates an example server according to an embodiment of this disclosure.
Figure 3:
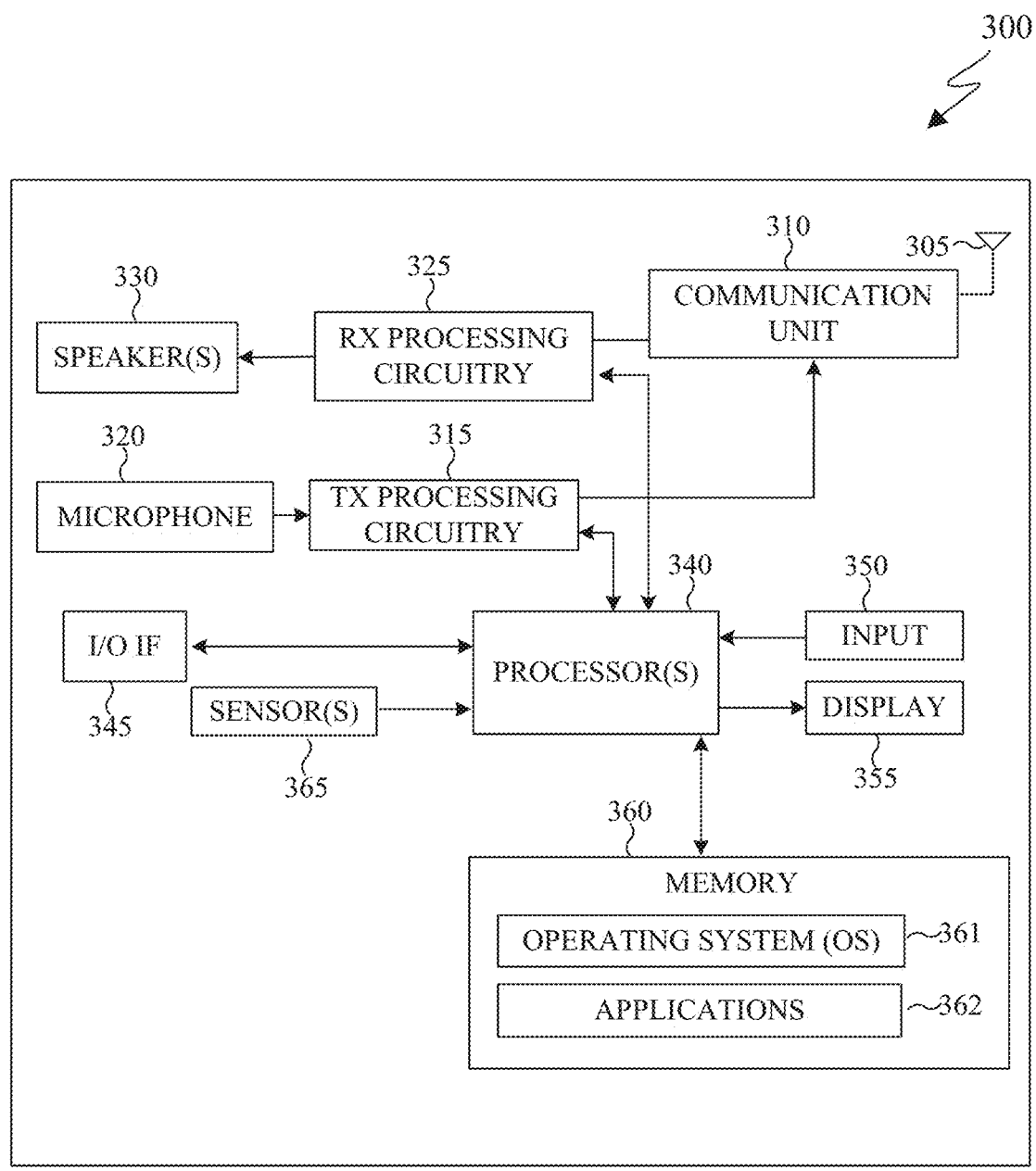
FIG. 3 illustrates an example electronic device according to an embodiment of this disclosure.

FIGS. 2 and 3 illustrate example devices in a communication system, such as the communication system 100 in FIG. 1, in accordance with embodiments of this disclosure. In particular, FIG. 2 illustrates an example server 200, and the server 200 could represent the server 104 in FIG. 1. The server 200 can represent one or more local servers, one or more remote servers, clustered computers and components that act as a single pool of seamless resources, a cloud-based server, a neural network, and the like. The server 200 can be accessed by one or more of the client devices 106-114.

As shown in FIG. 2, the server 200 includes a bus system 205 that supports communication between at least one processing device 210, at least one storage device 215, at least one communications interface 220, and at least one input/output (I/O) unit 225.

The processing device 210, such as a processor, executes instructions that can be stored in a memory 230. The processing device 210 can include any suitable number(s) and type(s) of processors or other devices in any suitable arrangement. Example types of the processing devices 210 include microprocessors, microcontrollers, digital signal processors, field programmable gate arrays, application specific integrated circuits, and discrete circuitry.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a RAM or any other suitable volatile or non-volatile storage device(s). The persistent storage 235 can contain one or more components or devices supporting longer-term storage of data, such as a hard drive, ROM, Flash memory, or optical disc.

The communications interface 220 supports communications with other systems or devices. For example, the communications interface 220 could include a network interface card or a wireless transceiver facilitating communications over the network 102. The communications interface 220 can support communications through any suitable physical or wireless communication link(s).

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-114. For example, a desktop computer 106 or a laptop computer 112 could have the same or similar structure as that shown in FIG. 2.

FIG. 3 illustrates an example electronic device 300, and the electronic device 300 could represent one or more of the client devices 106-114 in FIG. 1. In some embodiments, the electronic device 300 is useable with data transfer applications, such providing and receiving information from a server. The electronic device can be a TV (such as SAMSUNG SMART TV). The electronic device 300 can be a digital video disc (DVD) player, a TV box (such SAMSUNG HOMESYNC, APPLETV, or GOOGLE TV), a gaming console (such as an XBOX, PLAYSTATION, or NINTENDO), or any of the other types of electronic devices described above. The electronic device 300 can be a mobile communication device, such as, for example, a mobile station, a subscriber station, a wireless terminal, a desktop computer (similar to desktop computer 106 of FIG. 1), a portable electronic device (similar to the mobile device 108, PDA 110, laptop computer 112, or tablet computer 114 of FIG. 1), and the like.

As shown in FIG. 3, the electronic device 300 includes an antenna 305, a communication unit 310, transmit (TX) processing circuitry 315, a microphone 320, and receive (RX) processing circuitry 325. The communication unit 310 can include, for example, a radio frequency (RF) transceiver, a BLUETOOTH transceiver, a WI-FI transceiver, a ZIGBEE transceiver, an infrared transceiver, and the like. The electronic device 300 also includes a speaker 330, a processor 340, an input/output (I/O) interface (IF) 345, an input 350, a display 355, a memory 360, and a sensor(s) 365. The memory 360 includes an operating system (OS) 361 and one or more applications 362.

The communication unit 310 receives, from the antenna 305, an incoming RF signal transmitted from an access point (such as a base station, WI-FI router, or Bluetooth device) or other device of the network 102 (such as a WI-FI, Bluetooth, cellular, 5G, LTE, LTE-A, WiMAX, or any other type of wireless network). The communication unit 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The communication unit 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in a memory 360, such as the OS 361, in order to control the overall operation of the electronic device 300. For example, the processor 340 could control the reception of forward channel signals and the transmission of reverse channel signals by the communication unit 310, the RX processing circuitry 325, and the TX processing circuitry 315 in accordance with well-known principles. The processor 340 can include any suitable number(s) and type(s) of processors or other devices in any suitable arrangement. For example, in some embodiments, the processor 340 includes at least one microprocessor or microcontroller. Example types of processor 340 include microprocessors, microcontrollers, digital signal processors, field programmable gate arrays, application specific integrated circuits, and discreet circuitry The processor 340 is also capable of executing other processes and programs resident in the memory 360, such as operations that receive, store, and timely instruct by providing an input into a neural network. The processor 340 can move data into or out of the memory 360 as required by an executing process. In some embodiments, the processor 340 is configured to execute a plurality of applications 362 based on the OS 361 or in response to signals received from external source(s) or an operator. Example applications 362 can include a camera application (for still images and videos), a video phone call application, an email client, a social media client, an SMS messaging client, a virtual assistant, and the like. The processor 340 is also coupled to the I/O interface 345 that provides the electronic device 300 with the ability to connect to other devices, such as client devices 104-116. The I/O interface 345 is the communication path between these accessories and the processor 340.

The processor 340 is also coupled to the input 350 and the display 355. The operator of the electronic device 300 can use the input 350 to enter data or inputs into the electronic device 300. Input 350 can be a keyboard, touch screen, mouse, track ball, voice input, or other device capable of acting as a user interface to allow a user in interact with electronic device 300. For example, the input 350 can include voice recognition processing, thereby allowing a user to input a voice command. As another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. Input 350 can be associated with sensor(s) 365 and/or a camera by providing additional input to processor 340. In some embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc.

The electronic device 300 further includes one or more sensors 365 that can meter a physical quantity or detect an activation state of the electronic device 300 and convert metered or detected information into an electrical signal. For example, the sensor 365 can include one or more buttons for a touch input, a camera, a gesture sensor, an IMU sensors (such as a gyroscope or gyro sensor and an accelerometer), an air pressure sensor, a magnetic sensor or magnetometer, a grip sensor, a proximity sensor, a color sensor, a biophysical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an infrared (IR) sensor, an ultrasound sensor, an iris sensor, a fingerprint sensor, and the like. The sensor 365 can further include control circuits for controlling any of the sensors included therein. Any of these sensor(s) 365 can be located within the electronic device 300.

Although FIGS. 2 and 3 illustrate examples of devices in a communication system, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication networks, electronic devices and servers can come in a wide variety of configurations, and FIGS. 2 and 3 do not limit this disclosure to any particular electronic device or server.

According to embodiments of this disclosure, a server 104 obtains training data from reliable sources such as NIELSEN data. The training data can include household demographic data, personal identification data, television program title data and watch time data.

Figure 4:
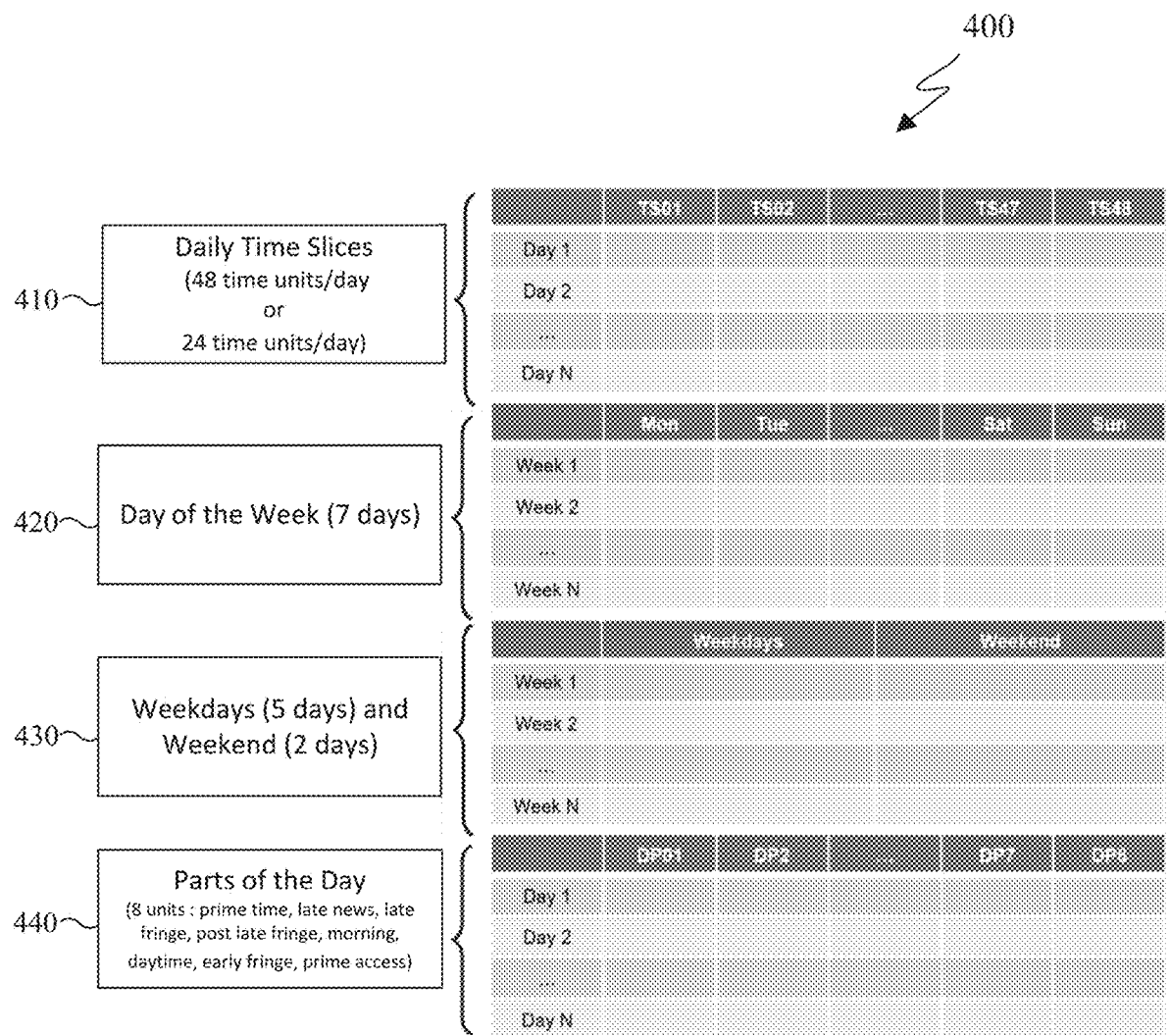
FIG. 4 illustrates how data can be broken up into a time-sensitive feature set according to an embodiment of this disclosure.

The training data is used with feature sets to perform general machine learning and deep learning algorithms to create a predictive model. Various feature sets based on time, keywords, and/or television program titles can be created. FIG. 4 illustrates how data can be broken up into a time-sensitive feature sets according to embodiments of this disclosure. The example embodiments of the time-sensitive feature sets 400 shown in FIG. 4 are for illustration only and other embodiments could be used without departing from the scope of the present disclosure.

According to an embodiment illustrated in FIG. 4, time sensitive feature sets can include: daily time slices for a twenty-four hour day including forty-eight time units of thirty minutes each (Time Slice 01 (TS01) through Time Slice 48 (TS48)) or twenty-four time units of one hour each 410; daily time slices for a twenty-four hour day including twenty-four time units of one hour each (not explicitly illustrated in FIG. 4); seven days of the week 420 (one for every day of the week); a weekday or weekend time unit 430 (Monday-Friday/Saturday and Sunday); a number of parts of the day time units 440 (for example, eight day parts: early morning, daytime, early fringe, prime access, prime time, late news, late fringe, and post late fringe).

According to embodiments of this disclosure, one or more other feature sets can be based on keywords for one or more television programs. According to embodiments of this disclosure, another feature set(s) includes features associated with the one or more television program titles. The predictive model can also use time-related features representing behavioral patterns formed over a long period of time along with keyword or title-based features in order to infer demographic attributes according to embodiments of this disclosure.

The training data can be divided up according to the various feature sets (for example, time slices, keyword or program title) to output preliminary information according to embodiments of this disclosure. For example, for every person of the training data and for each 30-minute time slice, the following preliminary information can be obtained for a time period of N, where N is a configurable number based on weeks, months, days or hours: total duration of display time in minutes; the fraction of the total duration of display time accumulated over N time periods; total duration of related program watch time or a fraction of the total duration of related program watch time for different genres; the number of times or the percentage of times the TV was turned on; the total number, average number or median number of different channels watched; the total number, the average number or median number of different genres of programs watched; the total number, the average number or the median number of display time chunks (that is, blocks of time) the user watched the TV. For each type of time slice (for example, daily, weekday/weekend, parts of the day), the preliminary data information for a time period N can be obtained.

According to embodiments of this disclosure the server 104 acquires viewing history from the electronic device, such as a TV 107. The viewing history can include Electronic Programing Guide (EPG) data or Automatic Content Recognition (ACR) data associated with at least one user according to embodiments of this disclosure. According to embodiments of this disclosure the content history consumption data can be gathered or categorized into sessions in the first step of turning machine logs in to human-centric data logs. Examples of content history consumption sessionization are illustrated in FIGS. 5 and 6.

FIG. 5 illustrates an example of sessionization of viewing history 500 according to embodiments of this disclosure. The embodiment of the sessionization 500 shown in FIG. 5 is for illustration only and other embodiments could be used without departing from the scope of the present disclosure.

The content history consumption data is generally collected at each event level 510. Each event level shows a time, who is watching the TV, what show is being watched and the channel of the show. Sessionization 500 consolidates each event level 510 into one session 520 for event levels that reflect the same type of viewing behavior. That is, one session 520 represents all datapoints (event levels) from 8:00 to 8:30 wherein John Doe watched "XYZ-TV-SHOW Season 1, Episode 1" on Channel 1.

Figure 6:
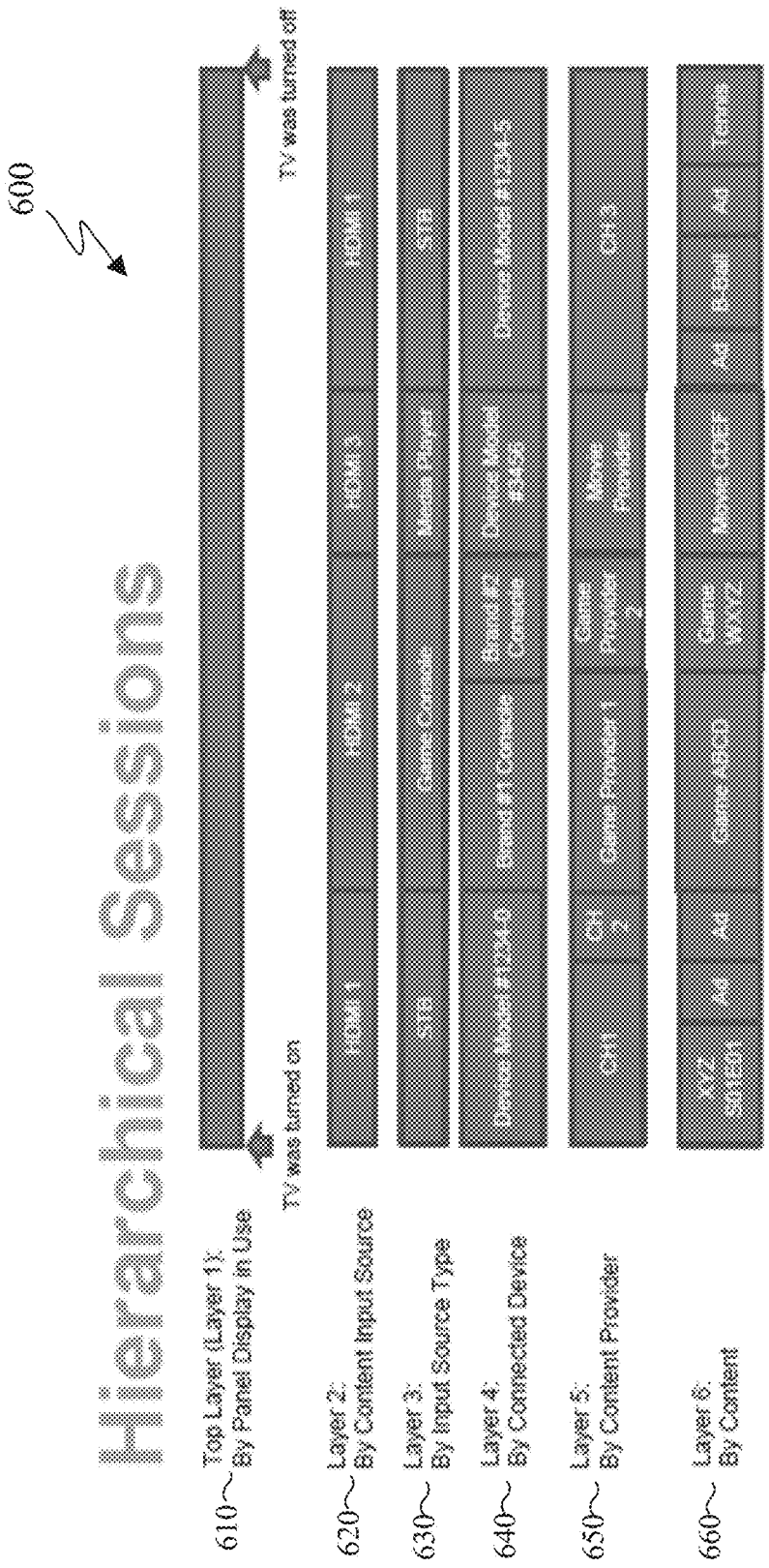
FIG. 6 illustrates and example of hierarchical sessionization of viewing history according to an embodiment of this disclosure.

FIG. 6 illustrates how the viewing history can be divided up by hierarchical sessionization 600 according to embodiments of this disclosure. The embodiment of the hierarchical sessionization 600 shown in FIG. 6 is for illustration only and other embodiments could be used without departing from the scope of the present disclosure.

Referring to the non-limiting example of FIG. 6, hierarchical sessionization 600 intelligently structures the viewing history as well as device usage as a hierarchy in the representation of: global session data; input source session data; HDMI-connected external device session data; channel session data; program session data; and genre session data. For example, as illustrated in FIG. 6, Layer One (or Top Layer) data 610 depicts the duration of time from when the TV was turned on and the TV was turned off. That is, Layer One reveals duration of time during which at least one user is watching the TV. Layer Two data 620 reveals content as divided up by input source, that is how much time was spent using each input source. For example, based on Layer Two, content can be divided into content from HDMI 1 input source, content from HDMI 2 input source, and content from HDMI 3 input source. Layer Three data 630 is divided into the amount of time that is spent based on the type of input source, for example, Set Top Box (STB), game console, or media player. Layer Four data 640 narrows the type of device to specifics such as model and brand, for example, device model #1234-0, brand #1 console, brand #2 console, device model #3456, device model #1234-5. Layer Five data 650 shows time spent watching each content provider, for example, Channel 1 (CH1), Channel 2 (CH2), game provider 1, game provider 2, movie provider, Channel 3 (CH3). Layer Six data 660 reveals the amount of time spent watching specific content or genres, for example, Episode 1 of Season 1 of a television show entitled "XYZ" (XYZ S01E01), a first advertisement, a second advertisement, a game entitled "ABCD", another game entitled "WXYZ", a movie entitled "CDEF", a third advertisement, a b-ball television program, a fourth advertisement, and a tennis television program, etc.

According to embodiments of this disclosure, the viewing history, such as EPG or ACR data, is fed into the predictive model, by the server 104, and the predicative model is able to output demographic attributes. For example, the predictive model can predict: the number of household members, including the number of adults and the number of children; the household type, that is, single household (for example, male single household or female single household), multi-household without kids (for example, one male/one female, two or more males, two or more females, two or more adults with mixed female/male ratio); age groups, for example, teenagers and adults (for example, group 1: age 13-17, group 2: age 18-24, group 3: age 25-34; group 4: age 35-44; group 5: age 45-54; group 6: age 55-64; group 7: age 65+); and household income levels (for example group 1 less than $25K, group 2 between $25K-$50K, group 3 between $50K-$75K, group 4 between $75K-$100K, group 5 between $100K-$200K, group 6 over $200K, etc.). According to embodiments of this disclosure the EPG or ACR data can first be turned into human-centric data logs via sessionization or hierarchical sessionization before being fed into the predictive model. According to embodiments of this disclosure, the predictive model can take household level data from multiple communal devices and predict demographic information specific to a particular user. The server 104 is then able to facilitate targeted advertising and programming to the user.

FIG. 7 illustrates example feature vectors used by one or more machine leaning approaches, such as a combination of general machine learning and deep learning algorithms, for predicting household demographics 700 according to embodiments of this disclosure. The embodiment of the general machine learning and deep learning algorithms shown in FIG. 7 is for illustration only and other embodiments could be used without departing from the scope of the present disclosure.

Referring to the non-limiting example of FIG. 7, the sessionization or/and hierarchical sessionization data (illustrated in FIGS. 5 and 6) can be combined with feature sets (illustrated in FIG. 4) to create feature vectors that machine learning can use to train a predictive model for household demographics. According to embodiments of this disclosure over 7000 features are identified to use for household demographics predictions. Machine learning uses household identifiers 710 and personal identifiers 720 with the feature vectors 730 and labels 740 to train the predictive model. The labels 740 can include the number of members in a household, age groups and genders according to embodiments of this disclosure. For example, House Hold 1 (HH1) has three people. The same feature vector 730 will be applied to all members of that household when training the predictive model. According to embodiments of this disclosure, the predictive model can take household level data from multiple communal devices and predict demographic information specific to a particular user.

Figure 8:
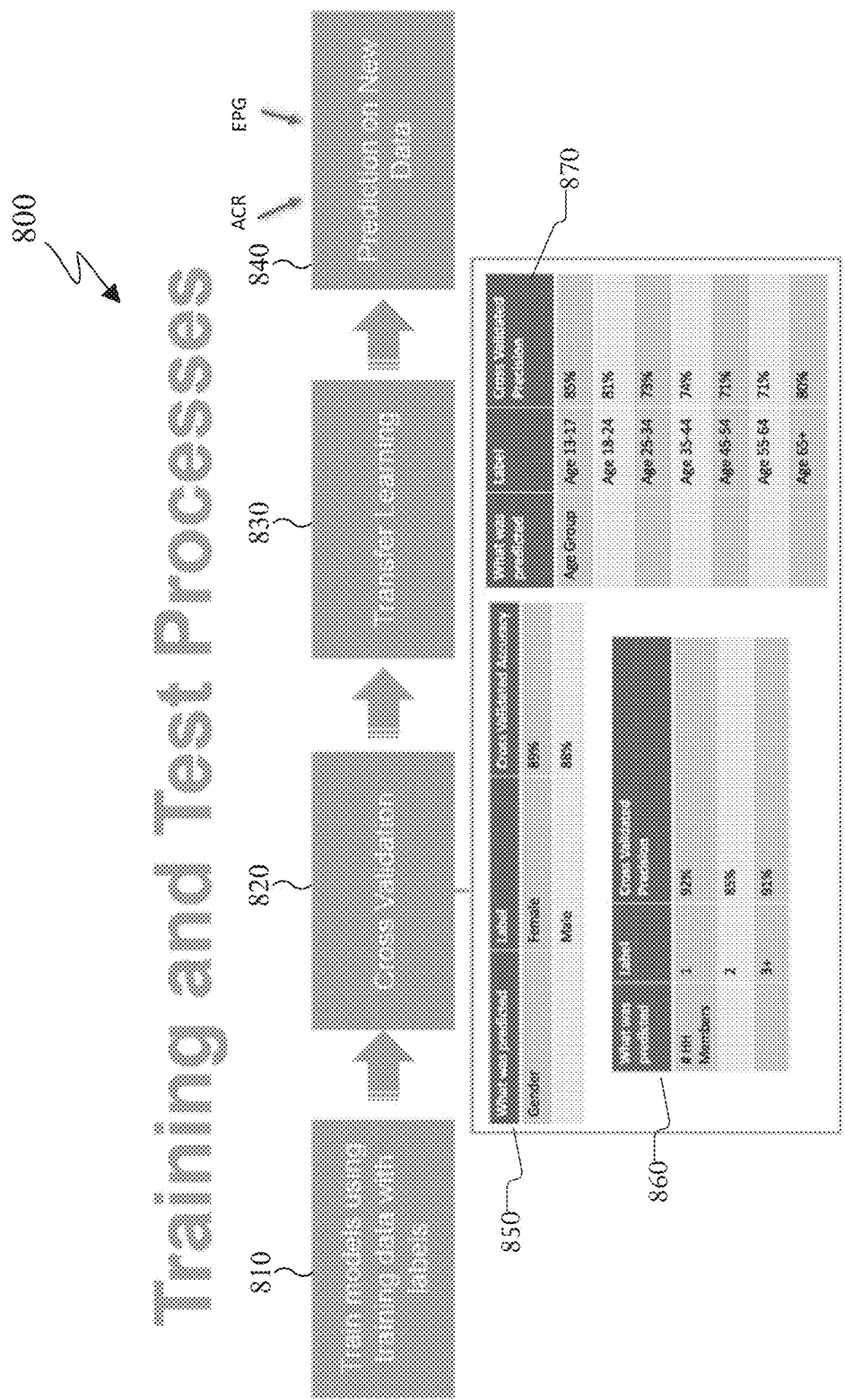
FIG. 8 illustrates example training and test processes used to develop and verify the predictive model according to an embodiment of this disclosure.

FIG. 8 illustrates example training and test processes 800 used to develop and verify the predictive model according to embodiments of this disclosure. The embodiment of the training and test processes used to develop and verify the predictive model shown in FIG. 8 is for illustration only and other embodiments could be used without departing from the scope of the present disclosure.

Referring to the non-limiting example of FIG. 8, in step 810, one or more machine learning approaches, such as a combination of machine learning and deep learning algorithms, train learning models using training data, such as NEILSEN data, that includes demographic labels such as gender, number of household members and age groups. In step 820, cross validation is performed. The training data is fed through the learning model to predict a user's gender, age group and/or the number of members in a household. As shown in gender table 850, the learning model has an 89% accuracy of predicting the gender of a user to be female and an 88% accuracy of predicting the gender of a user to be male. Household members table 860 illustrates that the learning model has a 92% accuracy of predicting a household with one member, an 85% accuracy of predicting a household with two members and a 91% accuracy of predicting a household with three or more members. The age group table 870 also illustrates a high accuracy of predicting the age group of a user. For example, predicting a user in age group 13-17 has an 85% accuracy, predicting a user in age group 18-24 has an 81% accuracy, predicting a user in age group 25-34 has a 73% accuracy, predicting a user in age group 35-44 has a 74% accuracy, predicting a user in age group 45-54 has a 71% accuracy, predicting a user in age group 55-64 has a 71% accuracy, and predicting a user in age group 65+ has an 80% accuracy. In step 830, the learning model is transferred to a predictive model that can be used to predict the demographics of a household without labels. In step 840, the predictive model can take proprietary data such as ACR data and EPG data and accurately predict household and individual user demographics according to embodiments of this disclosure.

Figure 9:
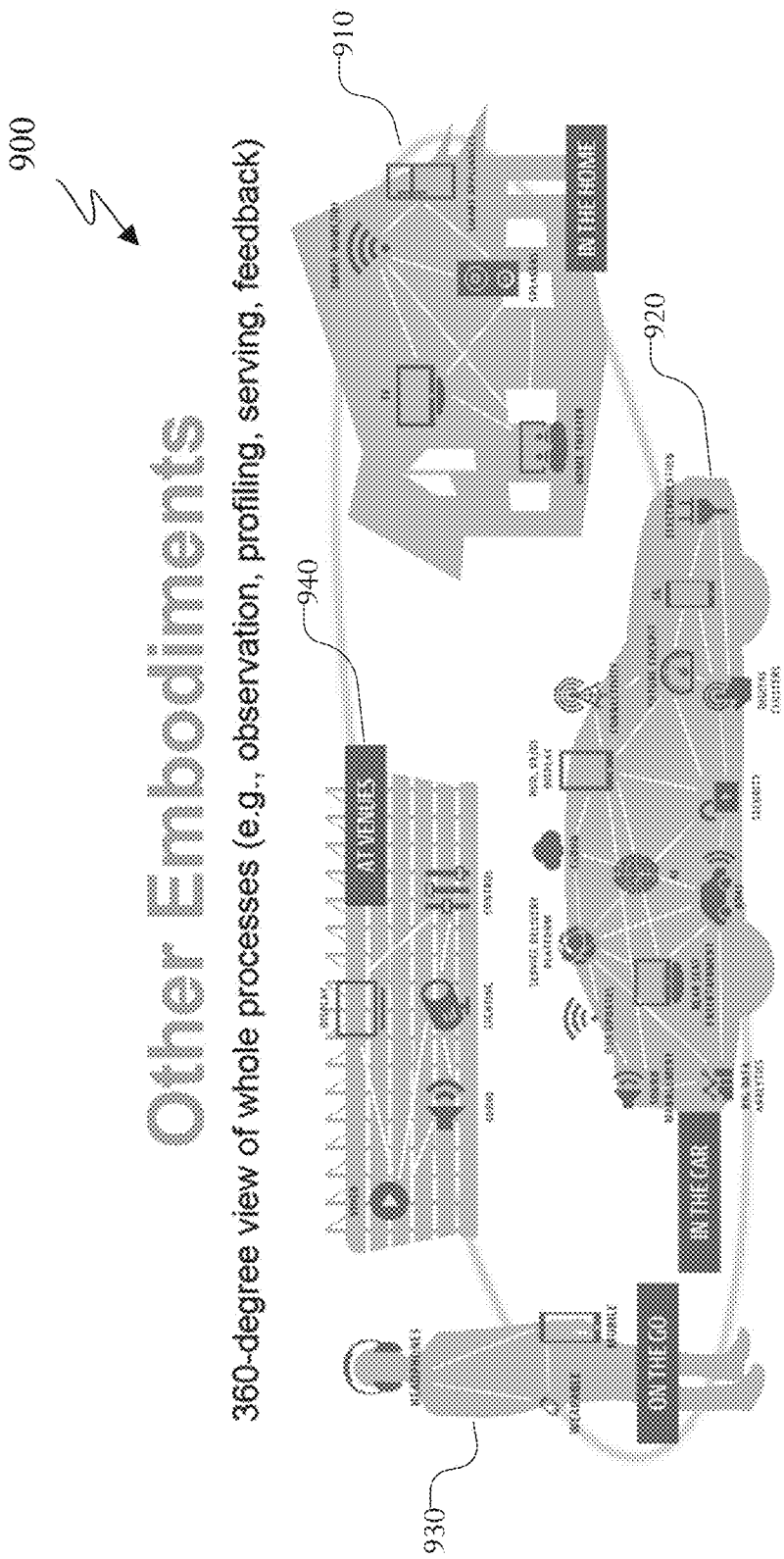
FIG. 9 illustrates examples of other embodiments applying a machine learning-based approach to demographic attribute inference using time-sensitive features.

FIG. 9 illustrates examples of other embodiments 900 applying a machine learning-based approach to demographic attribute inference using time-sensitive features. The example embodiments applying a machine-learning based approach to demographic attribute inference using time-sensitive features shown in FIG. 9 is for illustration only and other embodiments could be used without departing from the scope of the present disclosure.

Referring to the non-limiting example of FIG. 9, the machine-learning approach to demographic attribute inference using time-sensitive features as applied to television viewing habits can be modified and applied to various environments and systems including other home devices 910, automobile environments and systems 920, mobile devices 930 while a user is on the go and at multimedia venues 940.

Figure 10:
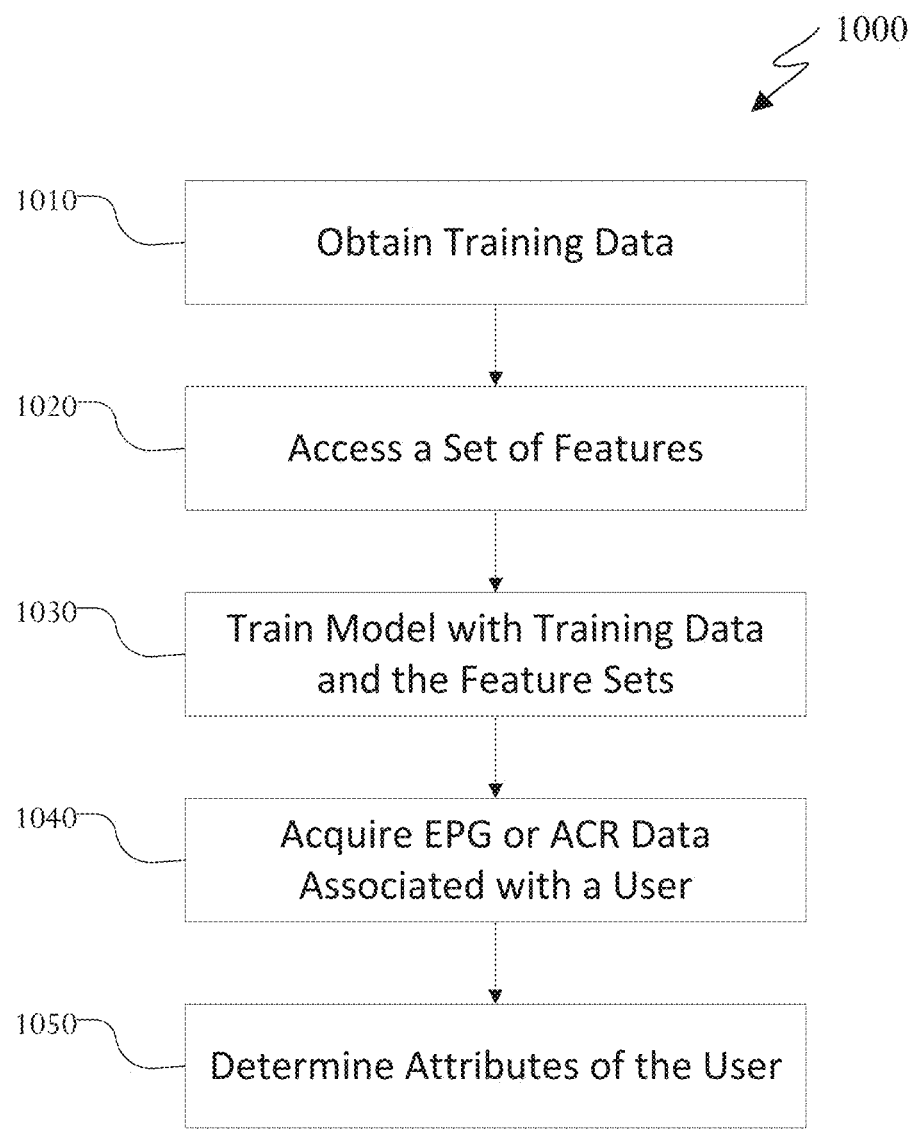
FIG. 10 is a block diagram that illustrates an example method of a machine learning algorithm to predict demographic attributes using time-sensitive features according to embodiments of this disclosure.

FIG. 10 illustrates an example method 1000 of a machine learning algorithm to predict demographic attributes using time-sensitive features according to embodiments of this disclosure. The method 1000 may be performed by the server 104 or any of the client devices 106-114 of FIG. 1, the server 200 of FIG. 2, the electronic device 300 of FIG. 3, or any other suitable device or system. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps.

In block 1010, the server 104 obtains training data from reliable sources such as NIELSEN data. The training data include household demographic data, personal identification data, program title data and watch time data In block 1020, one or more feature sets are assessed for use by a machine learning algorithm. The one or more feature sets can be time-sensitive feature sets, keyword based feature sets, and/or program title feature sets according to embodiments of this disclosure.

In block 1030 a machine learning algorithm trains a predictive model based on the training data and the one or more feature sets.

In block 1040, the server 104 acquires viewing history from the electronic device such as a TV 107. The viewing history can take the form of EPG or ACR data. The EPG or ACR data can be turned into human-centric data logs via sessionization of viewing history or hierarchical sessions according to embodiments of this disclosure.

In block 1050, the EPG or ACR data is fed into the predictive model and the predictive model is able to output demographic attributes associated with the at least one user, according to embodiments of this disclosure. The predictive model is able to output demographic data specific to each user in a household, regardless of the number of users in a household. The demographic data can include the number of people living in a household, the gender of each member, the age range of each user, and/or the household type and household income, etc.

Although various features have been shown in the figures and described above, various changes may be made to the figures. For example, the size, shape, arrangement, and layout of components shown in FIGS. 1 through 10, are for illustration only. Each component could have any suitable size, shape, and dimensions, and multiple components could have any suitable arrangement and layout. Also, various components in FIGS. 1 through 10 could be combined, further subdivided, or omitted and additional components could be added according to particular needs. Further, each component in a device or system could be implemented using any suitable structure(s) for performing the described function(s). In addition, whiles FIG. 10 illustrates various series of steps, various steps in FIG. 10 could overlap, occur in parallel, occur multiple times, or occur in a different order.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method for determining user attributes based on television viewing habits, the method comprising:
    acquiring, by a computing system, training data including one or more of household data, person identification data, program title data, or watch time data,
    assessing, by a processor of the computing system, a set of features including a first set of features associated with one or more specific time slices,
    training, by the processor of the computing system, a learning model to determine demographic attributes specific to particular users within a household based on the training data, the set of features, and demographic labels corresponding to possible demographic attributes,
    transferring, by the processor of the computing system, the learning model to a predictive model,
    acquiring, by the computing system, viewing history data from at least one communal electronic device that is viewed by multiple users within a specified household, each of the multiple users having one or more unknown demographic attributes associated with and specific to that user, and
    determining, by the processor of the computing system, the one or more unknown demographic attributes, from among the possible demographic attributes, associated with and specific to at least one of the multiple users within the specified household based on inputting the viewing history data from the at least one communal electronic device into the predictive model.

2. The method of claim 1, wherein the one or more specific time slices include at least one of: (1) 48 time units of 30 minutes each, (2) 24 time units of one hour each, (3) parts of a day, (4) days of a week, (5) a weekday, or (6) a weekend.

3. The method of claim 1, wherein the set of features includes a second set of features associated with one or more keywords for one or more television programs.

4. The method of claim 1, wherein the set of features includes a second set of features associated with one or more television program titles.

5. The method of claim 1, wherein the viewing history data comprises at least one of electronic programing guide (EPG) data or automatic content recognition (ACR) data.

6. The method of claim 5, wherein the viewing history data is transformed into user-centric smart data based on sessionization or hierarchical sessionization.

7. The method of claim 1, wherein the one or more unknown demographic attributes associated with and specific to the at least one of the multiple users comprises at least one of gender or age.

8. A computing system comprising:
    at least one processor configured to:
        acquire training data including one or more of household data, person identification data, program title data, or watch time data,
        assess a set of features including a first set of features associated with one or more specific time slices,
        train a learning model to determine demographic attributes specific to particular users within a household based on utilizing machine learning with the training data, the set of features, and demographic labels corresponding to possible demographic attributes,
        transfer the learning model to a predictive model,
        acquire viewing history data from at least one communal electronic device that is viewed by multiple users within a specified household, each of the multiple users having one or more unknown demographic attributes associated with and specific to that user, and
        determine the one or more unknown demographic attributes, from among the possible demographic attributes, associated with and specific to at least one of the multiple users within the specified household based on inputting the viewing history data from the at least one communal electronic device into the predictive model.

9. The computing system of claim 8, wherein the one or more specific time slices include at least one of: (1) 48 time units of 30 minutes each, (2) 24 time units of one hour each, (3) parts of a day, (4) days of a week, (5) a weekday, or (6) a weekend.

10. The computing system of claim 8, wherein the set of features includes a second set of features associated with one or more keywords for one or more television programs.

11. The computing system of claim 8, wherein the set of features includes a second set of features associated with one or more television program titles.

12. The computing system of claim 8, wherein the viewing history data comprises at least one of electronic programing guide (EPG) data or automatic content recognition (ACR) data.

13. The computing system of claim 12, wherein the at least one processor is configured to transform the viewing history data into user-centric smart data based on sessionization or hierarchical sessionization.

14. The computing system of claim 8, wherein the one or more unknown demographic attributes associated with and specific to the at least one of the multiple users comprises at least one of gender or age.

15. A non-transitory computer readable medium storing instructions that, when executed by at least one processor, cause the at least one processor to:
    acquire training data including one or more of household data, person identification data, program title data, or watch time data,
    assess a set of features including a first set of features associated with one or more specific time slices,
    train a learning model to determine demographic attributes specific to particular users within a household based on utilizing machine learning with the training data, the set of features, and demographic labels corresponding to possible demographic attributes,
    transfer the learning model to a predictive model,
    acquire viewing history data from at least one communal electronic device that is viewed by multiple users within a specified household, each of the multiple users having one or more unknown demographic attributes associated with and specific to that user, and determine the one or more unknown demographic attributes, from among the possible demographic attributes, associated with and specific to at least one of the multiple users within the specified household based on inputting the viewing history data from the at least one communal electronic device into the predictive model.

16. The non-transitory computer readable medium of claim 15, wherein the one or more specific time slices include at least one of: (1) 48 time units of 30 minutes each, (2) 24 time units of one hour each, (3) parts of a day, (4) days of a week, (5) a weekday, or (6) a weekend.

17. The non-transitory computer readable medium of claim 15, wherein the set of features includes a second set of features associated with one or more keywords for one or more television programs.

18. The non-transitory computer readable medium of claim 15, wherein the set of features includes a second set of features associated with one or more television program titles.

19. The non-transitory computer readable medium of claim 15, wherein the viewing history data comprises at least one of electronic programing guide (EPG) data or automatic content recognition (ACR) data.

20. The non-transitory computer readable medium of claim 19, wherein the instructions when executed further cause the at least one processor to transform the viewing history data into user-centric smart data based on sessionization or hierarchical sessionization.

* * * * *